March 7, 1939. V. J. SEDLON ET AL 2,149,367
VALVE STRUCTURE
Filed April 17, 1937 2 Sheets-Sheet 1

INVENTORS
Vincent J. Sedlon and
BY Edward W. Pierie
Fisher, Moen & Moore
ATTORNEYS

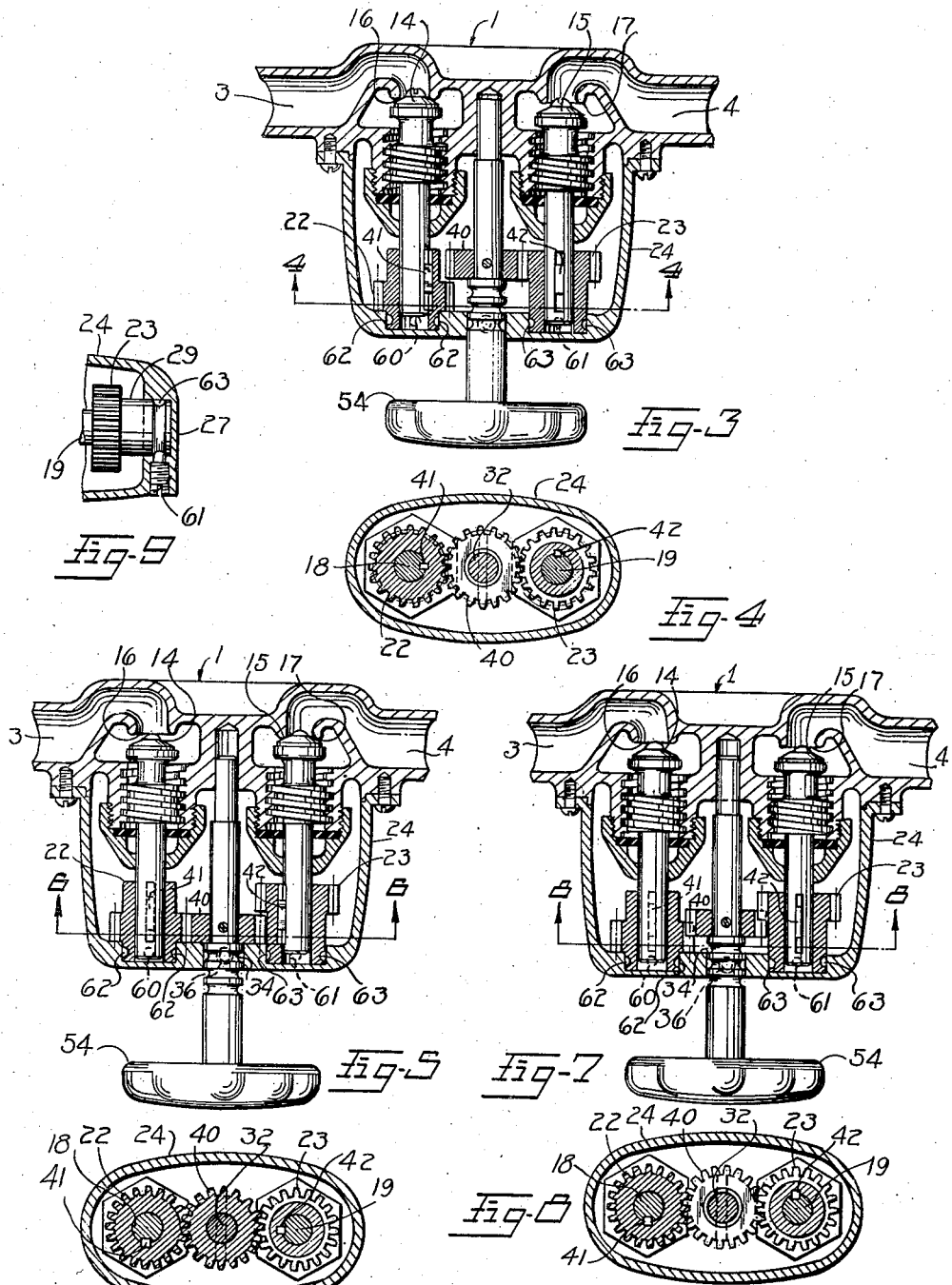

Patented Mar. 7, 1939

2,149,367

UNITED STATES PATENT OFFICE 2,149,367

VALVE STRUCTURE

Vincent Joseph Sedlon and Edward W. Pierie, Cleveland, Ohio

Application April 17, 1937, Serial No. 137,568

4 Claims. (Cl. 277—18)

This invention relates to improvements in valve structures adapted to control the flow of hot or cold water or a mixture of hot and cold water.

One of the principal objects of the invention is to provide a compact easily operated valve unit of simple construction whereby the operator can obtain a supply of hot water, cold water or any desired admixture or volume of hot and cold water by means of a single control element.

Other objects and advantages of the invention will be apparent as the description is considered in connection with the accompanying drawings, in which:

Figure 3 is a section similar to that seen in Figure 1 but showing the cold water valve partially open and hot water valve closed;

Figure 4 is a section on the line 4—4 of Figure 3;

Figure 5 is a section similar to that seen in Figure 3, but showing the hot water valve partially open and the cold water valve closed;

Figure 6 is a section on the line 6—6 of Figure 5;

Figure 7 is a sectional view similar to that of Figure 3, but showing both hot and cold water valves open;

Figure 8 is a section on the line 8—8 of Figure 7, and

Figure 9 is a section through hood showing locking pin for gear.

Figure 1:
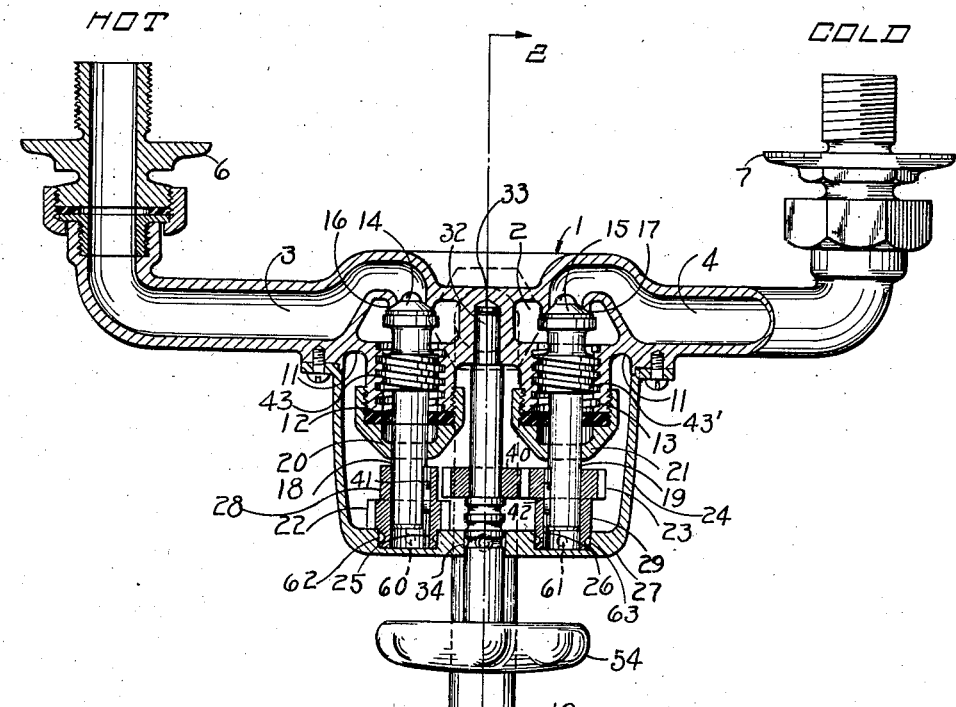
Figure 1 is a plan view partly in section of the improved valve unit showing the hot and cold water valves in closed position.

Referring more particularly to the drawings 1 denotes a casing or fitting the interior of which constitutes a mixing chamber 2. Hot and cold water is delivered to the chamber 2 through leads or pipes 3 and 4 respectively. These inlets are removably attached to the wall 5 of a kitchen or other room in which the device is mounted, by means of supply connections or coupling members 6 and 7 which in turn connect with hot and cold water supply pipes, not shown. An outlet opening 8, centrally disposed in the bottom wall 9 of the mixing chamber with respect to the hot and cold water inlets, places the mixing chamber 2 in communication with a swiveled spout 10, through which hot or cold water or a mixture of hot and cold water is delivered.

The front wall 11 of the mixing chamber is formed with two tubular interiorly threaded extensions 12 and 13 in which valves 14 and 15, are threadedly mounted for axial adjustment toward and away from valve seats 16 and 17 aligned therewith. The stems 18 and 19 of these valves which are formed with enlargements 43 and 43' for this purpose, project outwardly or forwardly through stuffing boxes 20 and 21 and have gears 22 and 23 slidably keyed to their respective outer ends. A hood or casing 24 suitably secured to the outer wall 11 of the mixing chamber 2 and enclosing the valve stems, is formed with recesses 25 and 26 in its outer end wall 27 for rotatably receiving sleeves or extensions 28 and 29 formed on the respective gears 22 and 23. Threaded pins 60 and 61 having spherical ends for engagement in grooves 62 and 63 respectively hold the gears 22 and 23 against axial displacement. When valve 14 engages its valve seat 16, communication between the hot water lead 3 and the mixing chamber 2 is cut off and when valve 15 is seated on seat 17 the flow of cold water from lead 4 to the mixing chamber 2 is cut off, and of course when these valves are closed there will be no flow from the mixing chamber to and through spout 10.

Actuation of the hot and cold water valves 14 and 15, is effected by means of an axially and rotatably movable control member 30 comprising a stem 31 having a reduced inner end 32 seated in a bearing recess 33, formed in a cross portion 53, extending between the front and rear walls of the mixing chamber. The outer end of the stem extends forwardly through an opening 34 in the hood or casing 24 and is provided with a handle 54. The stem 31 is also formed with a plurality of peripheral grooves 35, preferably three in number, for cooperation with a latch member 45 comprising a ball bearing 36 and an expansion spring 37. An adjustment screw 38 retains the ball bearing 36 and spring 37 within a recess 39, formed in the front wall of the hood 24, and regulates the tension with which the bearing is forced into the grooves.

Figure 2:
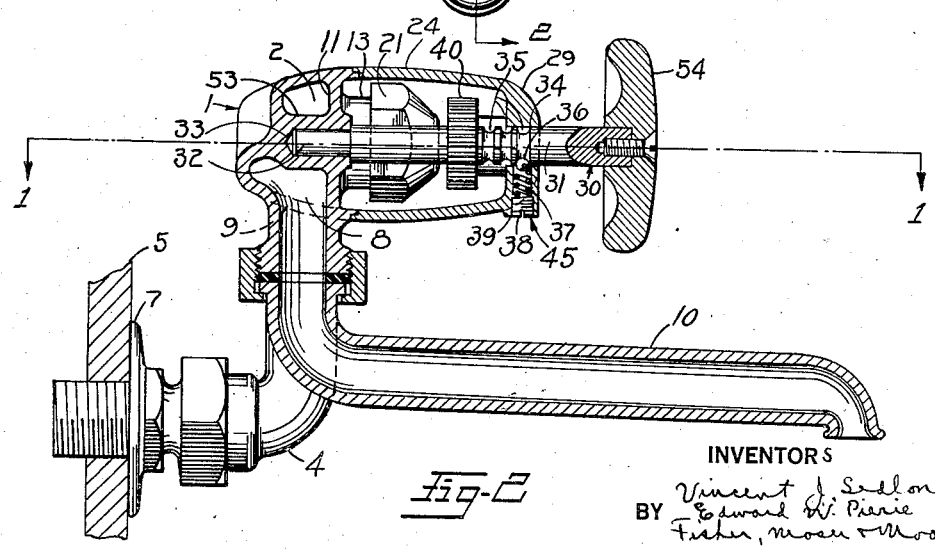
Figure 2 is a section taken on the line 2—2 of Figure 1.

Fixed to the control stem 31 adjacent the innermost groove 35 is a gear 40 which is adapted for selective engagement with either or both of the gears 22 and 23 for the respective hot and cold water valves 14 and 15. In this connection it will be noted that although the stems 18, 19 and 31 are in the same horizontal plane, the hot water valve gear 22 is outwardly offset or staggered with respect to the gear 23, so that the gear 40 when in its innermost Figure 1 position meshes with the gear 23 and is entirely out of mesh with the gear 22. In this position the latch 45 seats in the outermost peripheral groove 35 and prevents accidental displacement. Rotation of the control element 30 in an anti-clockwise direction imparts clockwise rotary movement to cold water valve 15 thus causing the valve stem 19 to move outwardly through the sleeve extension 29 on the gear 23. The distance between the outer end of the stem and the front wall of the hood 24 is sufficient to permit of the valve 15 being fully opened, that is moved from Figure 1 to Figure 3 position.

Instead of opening the cold water valve, or after having opened the same in the manner just described, the operator can readily open the hot water valve by axially shifting the control stem 31 outwardly to Figure 5 position or until the ball bearing 36 snaps into the innermost groove 35. Anti-clockwise rotation of the control member will now cause the hot water valve to rotate in a clockwise direction to open or partly open position, according to the extent the control member is rotated. Any desired mixture of hot and cold water can be delivered to the spout 10 by merely shifting the control member axially to cause its gear to engage either of the gears 22 or 23 to permit of the appropriate valve being actuated toward or away from its seat. It will of course be understood that keys 41 and 42 lock the hot and cold water valves and their respective gears against relative rotary movement while permitting free relative axial movement therebetween.

The control member 30 has a third or intermediate position, shown in Figure 7 in which the control gear 40 meshes with both gears 22 and 23, and the ball bearing 36 engages the middle or intermediate groove 35. When in this position, rotation of the control member simultaneously opens or closes or partly opens or closes the valves 14 and 15, according to whether the control member is rotated in a clockwise or anti-clockwise direction. The flow of hot and cold mixture can thus be regulated to any desired volume.

When the control member 30 is moved axially say from its innermost to intermediate and thence outermost position, the ball bearing 36 rides out of one groove 35 into another with an audible click, thus apprising the operator of the exact position of the control. The ball bearing 36 seats on the upper end of the expansion spring 37, and while serving to resiliently latch the control member against axial movement does not interfere with the free rotary movement of the control member.

What we claim is:

1. A device of the character described comprising a mixing chamber having a pair of inlet openings and an outlet opening, threaded valve members for said inlet openings, stems for said valves, a gear for each of said valves, a hood, the stems of said valves being slidably but nonrotatably keyed in said gears, and a single axially movable rotatable control member journaled in said hood having a gear adapted for individually engaging either of said gears or simultaneous engagement with said first mentioned gears for actuating said valves to individually or simultaneously open or close their respective inlet openings.

2. A device of the character described, comprising a mixing chamber having a pair of inlet openings and a discharge opening, valves controlling the inlet openings and each having a threaded connection for moving the same to and from the respective opening, a valve stem carried by each valve, a gear slidably keyed on each stem and said gears being arranged in staggered relation, an operating stem arranged between the gears and longitudinally movable, and a gear carried by said stem and so arranged that it can be brought into engagement with either of the valve gears or both of said gears for drawing either hot or cold water or a proper portion of each.

3. A device of the character described, comprising a mixing chamber having a pair of inlet openings and a discharge opening, valves controlling the inlet openings and each having a threaded connection for moving the same to and from the respective opening, a valve stem carried by each valve, a gear slidably keyed on each stem and said gears being arranged in staggered relation, an operating stem arranged between the gears and longitudinally movable, and a gear carried by said stem and so arranged that it can be brought into engagement with either of the valve gears or both of said gears for drawing either hot or cold water or a proper proportion of each and spring means for holding said valve stem in any of its three positions.

4. A device of the character described comprising a mixing chamber having a pair of inlet openings and a discharge opening, valves controlling the inlet openings and each having a threaded connection for moving the same to and from the respective opening, a valve stem carried by each valve and extending beyond the chamber, a hood carried by the chamber and surrounding the valve stems, a gear rotatably supported in the hood opposite each stem and in which the stem slidably operates but is held against rotation, a stem rotatably and longitudinally mounted in said hood intermediate the gears, a gear rigidly carried by said stem and adapted to be brought into engagement with either of the valve gears individually or both simultaneously and means in the hood engaging said stem for holding the same in any of its three positions.

VINCENT JOSEPH SEDLON.
EDWARD W. PIERIE.